Sept. 14, 1937. H. D. REY 2,092,776
FRUIT MANIPULATING MACHINE
Filed April 10, 1936 3 Sheets-Sheet 1

INVENTOR.
HENRI DANIEL REY
BY Miller Bayken & Bried
ATTORNEY.

Sept. 14, 1937.  H. D. REY  2,092,776

FRUIT MANIPULATING MACHINE

Filed April 10, 1936  3 Sheets-Sheet 3

INVENTOR.
HENRI DANIEL RAY
BY *Muller Boyken Bried*
ATTORNEY.

Patented Sept. 14, 1937

2,092,776

UNITED STATES PATENT OFFICE 2,092,776

FRUIT MANIPULATING MACHINE

Henri Daniel Rey, Papeete, Tahiti, assignor to The Anglo California National Bank of San Francisco, trustee, San Francisco, Calif., a corporation Application April 10, 1936, Serial No. 73,699

12 Claims. (Cl. 99—239)

This invention relates to a manipulatory treatment of fruit during the drying thereof, or such treatment of previously dried fruit, whereby an unusually soft, pliable, unctuous dried fruit product results, and in the case of drupaceous fruits the pits are loosened and substantially free from adherence to the flesh of the fruit, such fruit and its process of making being set out in detail in my copending application for United States patent filed under Serial No. 68,885 on March 14, 1936.

The principal object of the present invention is to provide mechanical apparatus, i. e. a machine, for carrying out the manipulatory steps of the process.

Another object of the invention is to provide a machine which will subject the fruit to a pressing, squeezing, or kneading action from all sides, yet avoid breaking the pits of the fruit if any there are.

Another object is to provide a machine which will subject the fruit to a very rapid percussive action applied to all sides of the fruit in rapid succession until the fruit is uniformly soft and pliable.

Another object is to provide such a fruit-manipulating machine which will loosen the pits from dry or partially dry drupaceous fruits treated thereby.

Another object of the invention is to provide a machine to carry out the manipulatory treatment of the fruit, in a continuous flow system.

Other objects and advantages of the invention will appear in the following description and accompanying drawings.

A machine according to my invention may take various forms, the essential requirement being that it works the fruit bodies in and out as by a kneading action from all sides, and preferably with a percussive action yet without breaking the skin or outer layer of the partially dried fruit, or breaking the pits, if any, within the fruit. In the drawings one form of machine which will do the work is shown, together with modifications of some of its features.

Briefly described the machine shown in the drawings consists of a hollow shaft or pipe through which a stream of the fruit is passed, preferably in single file, while rapidly reciprocating dies or hammers strike the fruit through openings around the hollow shaft as it passes along. The successive blows strike the fruit from all sides and knead the flesh until it is pliable and the pits loosened.

In the drawings Fig. 1 is a side elevation of the machine with portions broken away and others shown in section so as to show the relation of its parts.

Figure 1:
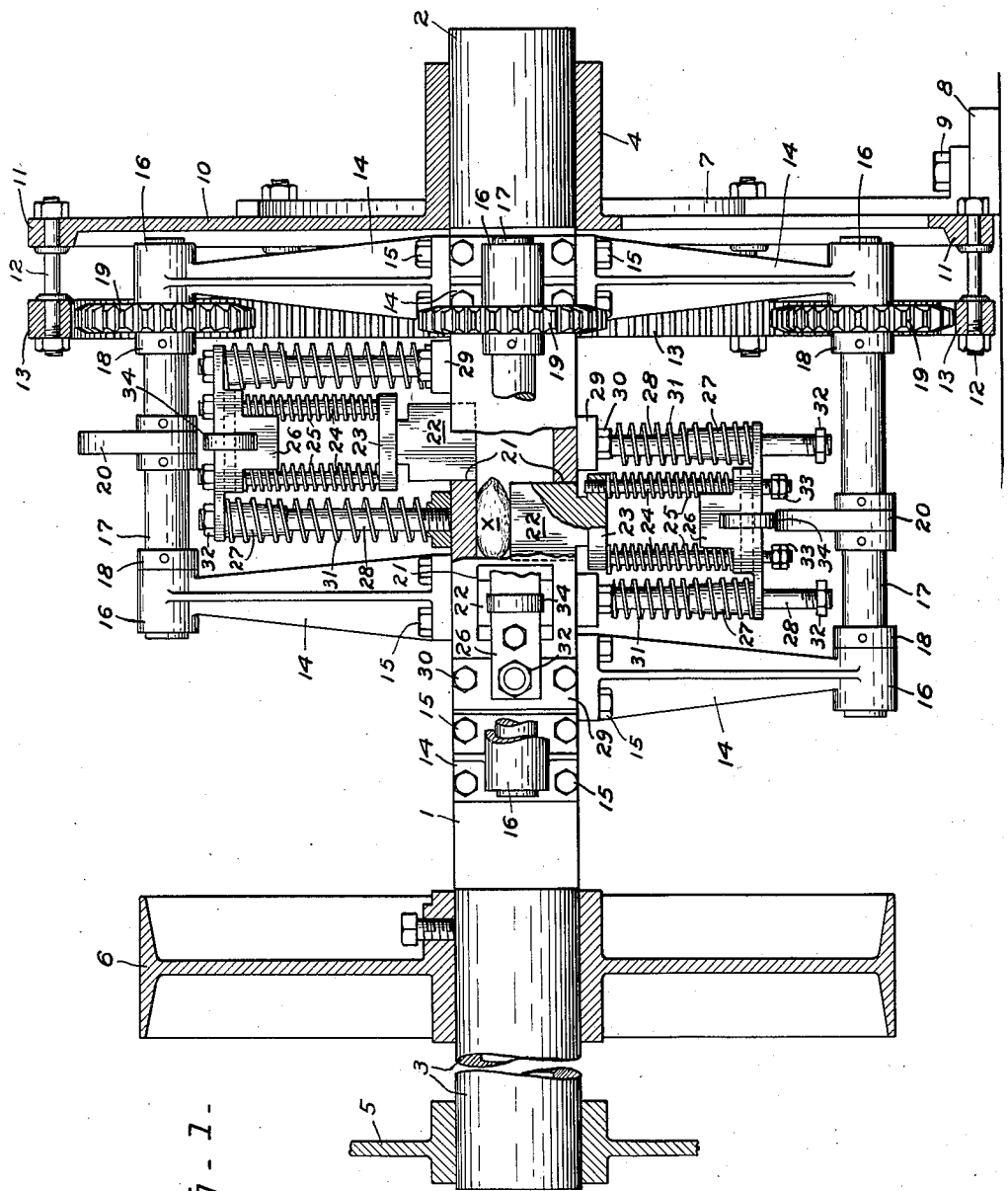
Figure 2:
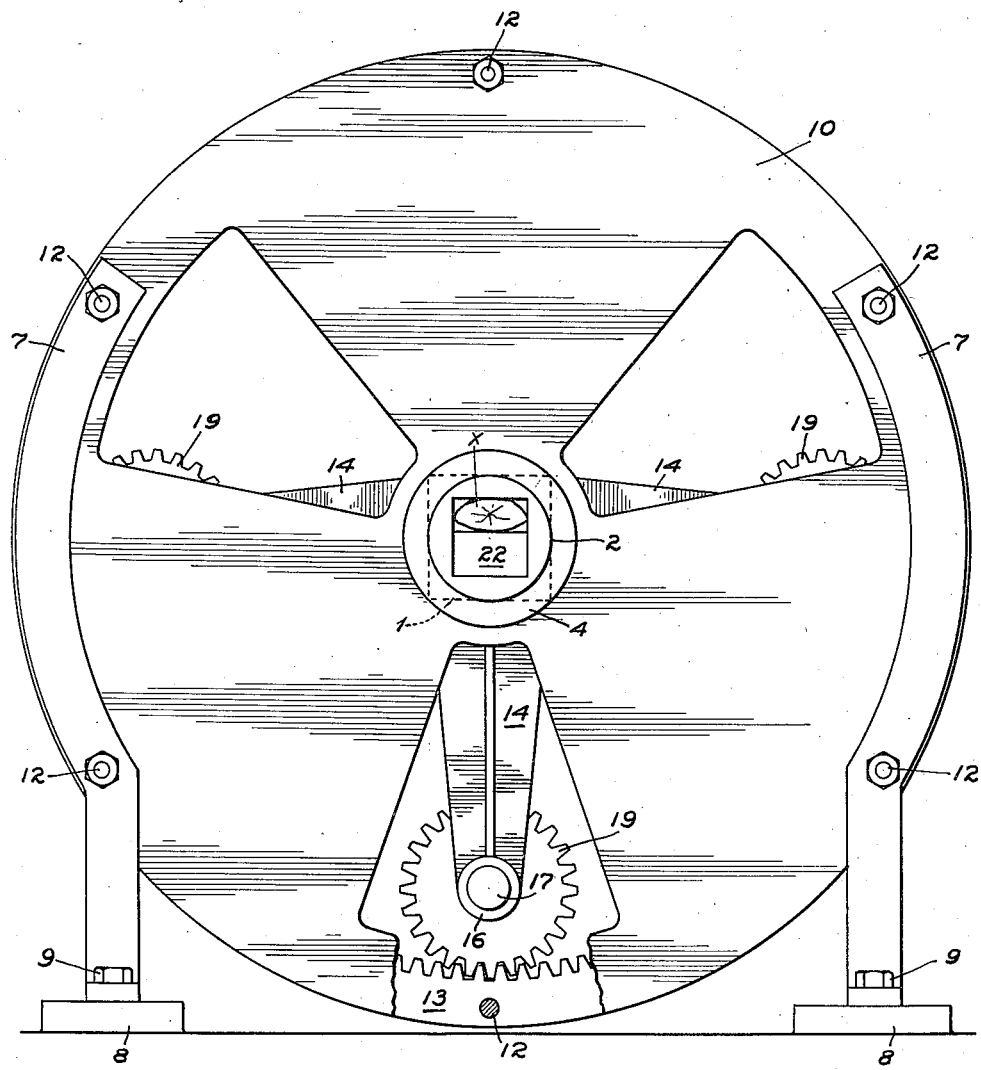
Fig. 2 is an end view of the machine of Fig. 1.

In further detail the central hollow shaft upon which the main elements of the machine are secured so as to revolve with it is here shown generally as of square cross section 1 and with its ends 2 and 3 of cylindrical cross section for support in suitable bearings 4, 5, and for attaching of a driving pulley 6. The bearings may be suitably supported as by pedestals or brackets 7 secured to a fixed or base member 8 as by bolts 9, and the right-hand bearing 4 is shown formed with a large flange or web-like spokes 10 provided with a thicker outer margin 11 through which extend spacer bolts 12 carrying at their inner ends an internal ring gear 13 and which by this means is held in fixed position with the hollow shaft free to revolve. Radially secured to the flat outer sides of the square hollow shaft are eight pedestals or brackets 14 held in position as by cap screws 15, and which brackets are formed at their outer ends into bearings 16, revolvably supporting small short shafts 17 which are arranged parallel with and around the central square shaft.

Small shafts 17 are provided with set collars 18 to hold them in proper position, and adjacent the right-hand end of each shaft 17 is secured a spur pinion 19 meshing with the teeth of the internal ring gear 13, all in a manner so that when the central square shaft is turned it will carry the assemblage of small shafts bodily around with it and the small shafts will be revolved in its bearings, to thereby revolve a rim cam 20 secured to each small shaft.

Cut through the four sides of the square hollow shaft at progressive points along its length are rectangular openings 21 and slidably fitting in each opening is a shoe or hammer block 22 formed with a flange 23 on its outer end radially extending from which are a pair of bolts or guide rods 24 surrounded with compression springs 25, and the outer ends of which bolts extend slidably through holes in a yoke member 26, in turn provided with bosses 27 drilled to slide freely on guide rods 28 also extending radially from the square shaft and secured thereto as by a small attaching plate 29 fastened in place by cap screws 30.

Surrounding guide rods 28 and bosses 27 are compression springs 31 arranged to normally force yoke member 26 outwardly, and both guide rods 28 and 24 are provided with nuts or stop collars at their outer ends as at 32, 33 to limit the movement of the yoke with respect to the guide rods, while rotatably mounted in a slot in the yoke is a roller 34 which is forced into contact with cam 20 by the action of springs 31 so that upon revolving of the cam 20 the yoke will be moved radially back and forth on its guides 28 and upon its inward movement it will compress springs 25 and thereby force the hammer block inwardly into the hollow square shaft 1 and impinge a piece of fruit which may be at that point within the hollow shaft and squeeze it against the opposite wall of the shaft as indicated in Fig. 1 wherein the fruit is designated X.

The strength of springs 25 is selected to provide a tight squeezing of the fruit yet not crack the pits, if any, within the fruit, as the blow of the hammer block being transmitted from cam 20 through the springs 25 is of course a yielding one upon meeting superior resistance.

For machines handling fruit which is naturally soft the springs are correspondingly of lighter gage wire. Upon cam 20 rolling over to its low side, springs 31 force the yoke 26 outward and upon its contacting nuts 33 the hammer block is also drawn outwardly to the position of the hammer block shown just above and to the right of the impinged fruit X. By properly setting the cams 20 the hammer blocks will strike the fruit at 90° displacements as the fruit advances through the bore of the shaft, and as the machine may be driven at a rapid rate from the driving pulley there may be several blows from a given hammer block upon a given piece of fruit before it passes, if desired.

In operation the machine is mounted at an angle so that fruit fed or pushed into the hollow shaft at the right-hand end will fall or slide through and out at the left-hand end after being subjected to the rapid blows of the hammer blocks from all sides. If desired, the machine may be mounted with the hollow shaft vertical or it may be mounted for adjustability of its angle so as to thereby control the flow of fruit through the hollow shaft by gravity as may be desired.

In the drawings but four hammers are shown, but it is evident that any number may be used, also that instead of the hollow shaft being square, it may be hexagonal and the hammers set at one-sixth of a circle instead of at quarters, or it may be round and with the hammers arranged in any manner or interval desired.

Figure 3:
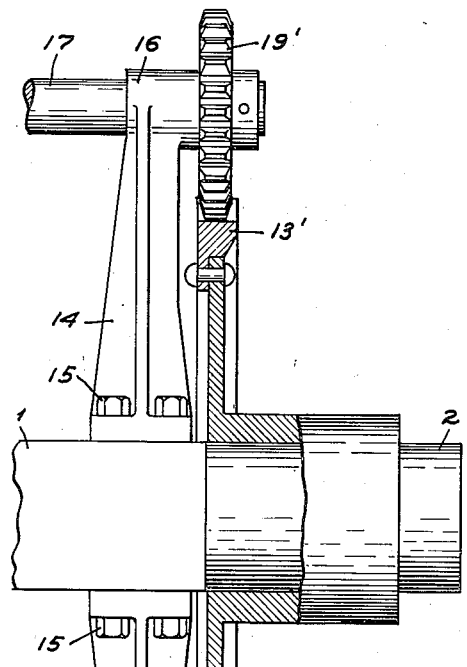
Fig. 3 is an elevation, partly in section, showing a modified driving gear arrangement for the machine.

Instead of the pinions 19 being driven from the fixed internal ring gear 13 by revolving around inside of it, it is manifest that the hollow shaft and its assembly may be fixed and the ring gear revolved. Also, instead of the internal ring gear an external gear 13' may be used with the pinions 19' engaging its exterior as shown in Fig. 3.

The means for reciprocating the hammers or hammer blocks may be varied considerably, for it is immaterial to the invention from a broad aspect as to just how they are operated, whether it be mechanical, electrical, or pneumatic, though the former is preferred for simplicity and upkeep.

Figure 4:
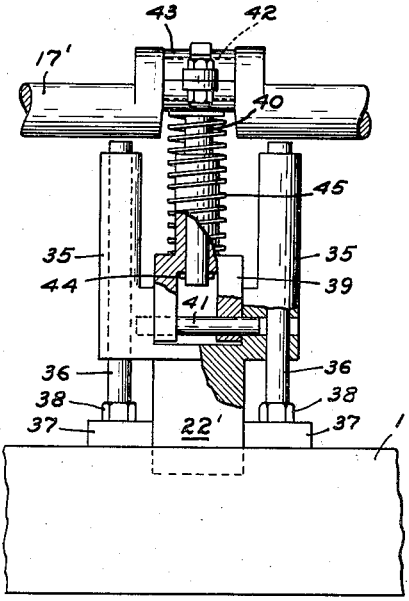
Fig. 4 shows an optional arrangement for actuating the hammers.
Figures 5, 6:
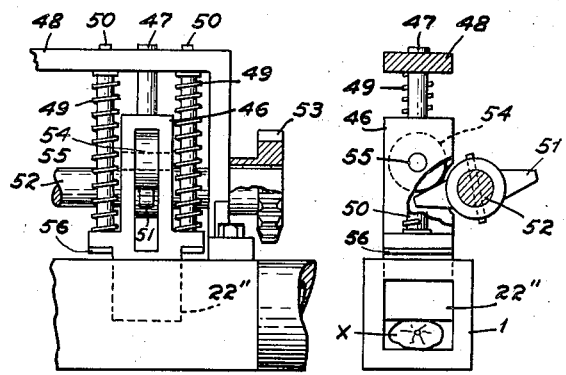
Fig. 5 is a cross section showing another arrangement for actuating the hammers.
Fig. 6 is a side view of the construction of Fig. 5.

In Figs. 4 and 5 two modifications of the mechanical actuation of the hammers are shown.

In Fig. 4 the hammer block is designated 22' and the pinion shaft 17'. The hammer block is here formed with two guiding extensions 35 which slide on guide rods 36 secured to the hollow shaft 1 as by foot plates 37 and cap screws 38, in the manner described for guide rods 28 of Fig. 1. In the present showing, however, a resilient crank connection is used between the pinion shaft 17' and the hammer block, and consists of a two-part or telescopic connecting rod 39, 40, the latter slidable within the former, the former pivotally connected to the extensions 35 of the hammer block by a pin 41, and the latter pivotally connected over a crank 42 formed on the pinion shaft 17' by means of a split bearing 43 the lower half of which may be integrally connected to inner connecting rod member 40. The inner member 40 extends through member 39 and is prevented from pulling out by a pin 44. To give the desired resilient blow to the fruit, the force applied to the hammer block is applied through a spiral compression spring 45 surrounding the telescopic connecting rod.

In the modification shown in Figs. 5 and 6, the hammer block 22'' is provided with a slotted extension 46 and is guided in its reciprocatory movement by means of a rod 47 at the outer end of the extension passing slidably through a hole in bracket 48 and the hammer block is normally forced downwardly, or rather inwardly, by compression springs 49 surrounding auxiliary guide rods 50 also extending from the hammer block slidably through holes in bracket 48. The hammer block is lifted outwardly against the pressure of springs 49 by means of one or more cam arms 51 carried on a shaft 52 which corresponds to shafts 17 of Fig. 1 and is provided with a pinion 53 for driving by a suitable fixed gear as described for Fig. 1. Cams 51 operate against the lower side of a roller 54 mounted on a pin 55 in the slot of hammer extension 46. The cams 51 will upon revolving of the shaft 52 raise and drop the hammer blocks to deliver sharp percussive blows upon the fruit X, but due to the telescopic connecting rod and springs 49 the blows are resilient so as to avoid cracking the pits of the fruit or breaking the outer flesh layer to force out the juices.

When no fruit happens to be in position a pair of soft leather pads 56 absorbs the blows.

Since my invention is only for the purpose of mechanically manipulating and softening dried fruits, my use of the words "dried fruit" or "partially dried fruit" herein and in the appended claims refers only to such dried fruits as commercially come under these terms and wherein the edible fleshy portion is exterior to the pits, if any, and does not include nuts in which the edible portion is within a hard shell as it is manifest that nuts cannot be softened by my invention, and the term "fruit", as used herein, is not applicable to them.

Having thus described my invention and illustrated one manner of carrying it out, together with modifications, it will be evident to anyone skilled in the art that numerous modifications may be made without departing from the spirit of the invention and scope of my appended claims.

I claim:

1. A machine of the character described comprising a tube through which the fruit passes, a series of hammers extending through the sides of the tube arranged to strike the fruit as it passes along, said tube being of square cross section, and said hammers extending respectively through the four sides of the tube in a manner to impinge the fruit against the wall of the tube opposite the hammer.

2. A machine of the character described comprising a tube through which the fruit passes, a series of hammers extending through the sides of the tube arranged to strike the fruit as it passes along, said tube being of square cross section, said hammers extending respectfully through the four sides of the tube in a manner to impinge the fruit against the wall of the tube opposite the hammer, means mounting the hammers on the tube for reciprocative movement in and out of the tube, and means actuating the hammers in succession.

3. A machine of the character described comprising a tube through which the fruit passes, a series of hammers extending through the sides of the tube arranged to strike the fruit as it passes along, said tube being of square cross section, said hammers extending respectively through the four sides of the tube in a manner to impinge the fruit against the wall of the tube opposite the hammer, means mounting the hammers on the tube for reciprocative movement in and out of the tube, means mounting the tube for bodily revolution carrying its hammers, and means actuating the hammers in succession as the tube revolves.

4. In a machine of the character described, a tubular shaft, bearings in which the shaft is mounted for rotation, a series of hammers extending into the tubular shaft through openings in its sides, brackets secured to the outside of the shaft guiding said hammers for reciprocative movement, a series of smaller shafts spaced around said tubular shaft, brackets secured to the tubular shaft rotatably supporting said smaller shafts, a pinion gear on each of said smaller shafts, a fixed master gear engaging all of the pinion gears for rotating same as the tubular shaft is revolved, and resilient power transmission means arranged to actuate said hammers from said smaller shafts upon rotation of the same.

5. In a machine of the character described, a tubular shaft, a series of hammers extending into the tubular shaft through openings in its sides, brackets secured to the outside of the shaft guiding said hammers for reciprocative movement, a series of smaller shafts spaced around said tubular shaft, brackets secured to the tubular shaft rotatably supporting said smaller shafts, a pinion gear on each of said smaller shafts, a master gear engaging all of the pinion gears for rotating same, and resilient power transmission means arranged to actuate said hammers from said smaller shafts upon rotation of the same.

6. In a machine for manipulating dried and partially dried fruit bodies, means for applying pressure against the individual fruit bodies at various sides in succession so as to knead or work the fruit bodies to soft pliable condition while preserving their individuality, and means guiding the fruit bodies in a continuous flow through the machine.

7. A machine for manipulating dried and partially dried fruit bodies comprising means guiding the fruit bodies along a path of travel, and means subjecting the fruit bodies individually to a percussive kneading action from various directions along said path, and whereby the bodies are rendered soft and pliable while preserving their individuality.

8. A machine for manipulating dried and partially dried fruit bodies comprising a series of hammers, means actuating the hammers in succession, and means guiding the fruit bodies in a stream past the hammers to receive their blows, said hammers arranged to strike the individual fruit bodies at various angles in a manner to work and soften the flesh of the fruit without mashing the same.

9. A machine for manipulating dried and partially dried fruit bodies comprising a series of hammers, means actuating the hammers in succession, means guiding the fruit bodies in a stream past the hammers to receive their blows, said hammers arranged to strike the individual fruit bodies at various angles in a manner to work and soften the flesh of the fruit, and resilient means arranged to control the force of the hammers to avoid rupture of the pits if any within in the fruit.

10. A machine of the character described comprising a tube through which the dried fruit passes, and a series of hammers extending through the sides of the tube arranged to strike the fruit bodies from various sides in a manner to work and soften the flesh of the bodies as they pass along.

11. A machine of the character described comprising a tube through which the fruit bodies pass, and a series of hammers extending through the sides of the tube arranged to strike the fruit bodies as they pass along, and means operatively supporting said hammers to extend into the tube at various angles so as to strike the fruit bodies from various angles in succession and hammer the bodies to soft pliable condition.

12. A machine of the character described comprising a tube through which the dried fruit passes, a series of hammers extending through the sides of the tube arranged to strike the fruit bodies from various sides in a manner to work and soften the flesh of the bodies as they pass along and impinge them against the wall of the tube, means for actuating said hammers including compression springs between the hammers and the actuating means arranged to permit lag of the hammers upon meeting a predetermined resistance so as to avoid injury to the fruit.

HENRI DANIEL REY.